(12) United States Patent
Klossek et al.

(10) Patent No.: US 8,597,777 B2
(45) Date of Patent: *Dec. 3, 2013

(54) TRANSPARENT FIRE-RESISTANT GLAZING WITH FLAME RETARDANT LAYER BETWEEN GLASS OR GLASS CERAMIC PANES

(75) Inventors: Jens Klossek, Weimar (DE); Ruediger Freitag, Moorgrund/Etterwinden (DE); Klaus-Dieter Schwabe, Apolda (DE); Stefan Meinhardt, Neustadt an der Orla (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,333

(22) Filed: Jun. 4, 2012

(65) Prior Publication Data
US 2012/0251804 A1    Oct. 4, 2012

Related U.S. Application Data

(62) Division of application No. 13/126,833, filed as application No. PCT/EP2009/007680 on Oct. 27, 2009, now Pat. No. 8,211,532.

(30) Foreign Application Priority Data

Oct. 31, 2008  (DE) .......................... 10 2008 054 149

(51) Int. Cl.
*B32B 7/02*     (2006.01)
*B32B 17/10*    (2006.01)

(52) U.S. Cl.
USPC ........ 428/215; 156/107; 156/108; 156/272.2; 156/275.5; 428/441; 428/442

(58) Field of Classification Search
USPC ............ 156/107, 108, 272.2, 275.5; 428/215, 428/441, 442
See application file for complete search history.

(56) References Cited

U.S. PATENT DOCUMENTS

| | | | |
|---|---|---|---|
| 6,242,506 B1 | 6/2001 | Fan et al. | .......................... 522/93 |
| 2005/0282018 A1 | 12/2005 | Van Den Bergen et al. | .. 428/426 |

FOREIGN PATENT DOCUMENTS

| | | |
|---|---|---|
| EP | 0 108 630 | 5/1984 |
| EP | 2 108 508 | 10/2009 |
| WO | 00/09619 | 2/2000 |
| WO | 2004/035308 | 4/2004 |
| WO | 2007/089054 | 8/2007 |

*Primary Examiner* — D. S. Nakarani
(74) *Attorney, Agent, or Firm* — Michael J. Striker

(57) ABSTRACT

The transparent fire-resistant glazing has at least two glass or glass ceramic panes with a gap between them, which is filled with a UV-cured material. It is made by curing a UV-curable material filling the gap with UV radiation. The UV-curable material includes polymerizable components, namely a monomer with acrylate functionality and an oligomer, and at least one bromine-containing flame retardant. The fire retardant can be a polybrominated diphenyl ether, a brominated alcohol, or a polybrominated cycloalkane, and/or a mixtures thereof. The glazing is made by a process in which the panes are cleaned and masked to form the gap between them, the UV-curable material is filled into the gap and then cured with the UV radiation.

18 Claims, No Drawings

TRANSPARENT FIRE-RESISTANT GLAZING WITH FLAME RETARDANT LAYER BETWEEN GLASS OR GLASS CERAMIC PANES

CROSS-REFERENCE

This is a divisional of U.S. patent application Ser. No. 13/126,833, filed on Jun. 9, 2011, which is the U.S. National Stage of PCT/EP 2009/007680, which was filed on Oct. 27, 2009, which, in turn, claims priority of invention based on German Patent Application 10 2008 054 149.4 filed on Oct. 31, 2008 in Germany. The aforesaid German Patent Application contains subject matter described and claimed herein below.

BACKGROUND OF THE INVENTION

The present invention relates to transparent, fire-resistant glazing composed of at least two panes, a layer of a UV-curable material being arranged in each case between these panes, the processes for production thereof and to the use thereof as multiple glazing, in mobile units, for example doors and windows, or fixed as an element of walls or facades.

Fire-resistant glazing serves, for example, as a fire-resistant barrier in an opening in a wall or else in an otherwise non-transparent filling of a door leaf. Fire-resistant glazing must be configured such that it can withstand the action of fire and heat, according to the standard, for a predetermined period, for example 30, 60, 90 or 120 or even 180 min. More particularly, it must not allow flames to strike through and must, under some circumstances, as an additional requirement, provide a room with a reliable barrier against smoke. In addition, in particular applications, it must offer good insulation against heat and restrict the radiant heat of a fire source. Requirement criteria on fire-resistant glazing are regulated especially in European standards EN 1363-1 "Fire Resistance Tests, General Standards" and DIN EN 1634 part 1 "Fire Resistance Tests for Doors and Shutter Assemblies, Part 1 Fire Doors".

In addition, fire-resistant glazing should also meet further requirements, for example, security requirements, especially requirements on impact resistance. In addition, fire-resistant glazing should also be suitable for sound insulation.

Commercially available laminated safety glass consists of at least two glass panes between which PVB (polyvinyl butyrate) films are generally arranged. The fragment-binding effect of the film is needed to ensure the safety glass properties. However, when such glasses are heated, the PVB film decomposes and forms inflammable gases which lead to flame formation on the side facing away from the fire and hence enable the spread of a fire.

A further commercially available fire-resistant safety glass consists of at least one heat-resistant, low-expansion glass ceramic pane or a thermally tempered borosilicate glass between which a fluorine-containing layer has been arranged.

In this case, sufficient adhesion between the glass or glass ceramic pane and the fluorine-containing intermediate layer is promoted using an adhesion promoter consisting of a fluorohydrocarbon and a solvent.

In addition, the bonding of glass ceramic or glass pane to films requires a complex and costly lamination operation, and a preliminary composite using elevated pressure and elevated temperatures, and also a subsequent autoclave operation.

When the glass ceramic pane is produced by means of a rolling process, a consequence is relatively high corrugation of the glass ceramic pane. A fluorine-containing film with a thickness of 0.5 µm is not very suitable in this case for production of a faultless end product which does not exhibit any bubbles in the laminated glass, since this film can only inadequately compensate for the unevenness in the glass ceramic pane. In order, however, to ensure such compensation, a costly and time-consuming grinding and polishing process of the glass ceramic pane is needed in addition.

Due to the only low layer thickness of the films used and the low elasticity thereof, the sound-insulating properties of laminated safety glasses with such films are also inadequate.

It is likewise not directly possible to produce laminates from individual glass panes with a thickness of <4 µm with films between them, which meet the safety glass properties required according to the highest category of DIN EN 12600.

SUMMARY OF THE INVENTION

It was therefore an aim of the present invention to provide a transparent fire-resistant glazing which overcomes the disadvantages of the fire-resistant glazing known from the prior art.

It was a further aim of the present invention to provide a transparent fire-resistant glazing which ensures protection from smoke and flames in the event of fire, exhibits safety glass properties, especially high fragment-binding action and high impact resistance, and has very good sound-insulating properties.

It was a further aim of the present invention to be able to bond glass panes or glass ceramic panes with relatively high unevenness of up to 0.7 mm/m, especially of 0.5 mm/m, such that they have a layer thickness sufficient for impact resistance and soundproofing, without needing to increase the layer thickness significantly.

It was a further aim of the present invention to provide transparent fire-resistant glazing which meets the highest standard in the pendulum impact test to DIN EN 12600.

It was likewise an aim of the present invention to provide transparent fire-resistant glazing which ensures integrity to EN 1363 after 90 min, preferably after 120 min.

The aforementioned aims are achieved by transparent fire-resistant glazing which comprises at least two panes each independently selected from the group consisting of glass panes and glass ceramic panes, and at least one layer (a) of a UV-curable material, each of said layers (a) being arranged between two of these panes, characterized in that said layer (a) comprises at least one bromine-containing flame retardant. The glass or glass ceramic is preferably transparent, especially highly transparent, and has a light transmittance of >80%, based on the pane or glazing. The transmittance is preferably at least 85%, especially at least 88%.

The inventive transparent fire-resistant glazing can also be used as safety glazing.

The term "comprising" in the context of the present invention is understood such that the list which follows is not conclusive and may or may not likewise comprise other additional items, for example one or more further features, components, constituents and/or substituents, if suitable.

The thickness of the glass pane or glass ceramic pane is preferably in the region of at least 2 mm, or 2.5 mm, particular preference being given to at least 3 mm or 3.2 mm. Preferred maximum thicknesses are 15 mm or 12 mm, a maximum of 10 mm being even more preferred. Particular preference is given to maximum thicknesses of 7 mm or 6 mm.

The thickness of layer (a) is preferably at least 0.5 or 0.6 mm, and at least thicknesses of 0.7 mm or 0.75 mm are even more preferred. Particular preference is given to minimum thicknesses of 0.8 mm. Preferred maximum thicknesses of layer (a) are at most 5 mm or 3 mm, and at most 2 mm or 1.5 mm is even more preferred. Particular preference is given to thicknesses of not more than 1.3 mm or 1.2 mm. In the case of uneven glasses, thicknesses of 1.5±0.3 mm have been found to be particularly appropriate.

The glass panes or glass ceramic panes and the layer (a) give rise to laminates with layers of different thickness.

For example, it is possible to combine a glass pane of thickness 4 mm with a further glass pane of thickness 5 mm and a layer (a) of thickness 1 mm.

Preferably, the minimum thickness of the laminates composed of glass panes or glass ceramic panes and the layer (a) is at least 5 mm to 5.5 mm, particular preference being given to thicknesses of at least 6 or 7 mm. Preferred maximum thicknesses are 15 mm or 13 mm, and maximum thicknesses of 12 mm or 11 mm are even more preferred. Very particular preference is given to thicknesses of not more than 10 mm or 8 mm.

The present invention thus enables provision of fire-resistant glazing with a low layer thickness, for example in the range between 6 and 8 mm. This fire-resistant glazing exhibits further advantages with regard to the reduced weight and increased transparency thereof. It can thus likewise be used in place of wired glass in standard frames.

The pane used in accordance with the invention typically consists of a glass or a glass ceramic. The glass pane or glass ceramic pane preferably consists in each case of a material selected from the group consisting of borosilicate glass and soda-lime glass, which may optionally also be tempered.

The glass used in accordance with the invention can be floated or drawn. More particularly, planar glass with parallel and fire-polished surfaces of high surface quality is used. In a preferred embodiment, the glass used is tempered, preferably by means of thermal or chemical processes.

The floating of soda-lime glasses and borosilicate glasses is known.

In the context of the present invention, soda-lime glasses are understood to mean those which are produced essentially from the starting materials silicon dioxide ($SiO_2$), lime ($CaCO_3$) and soda ($Na_2CO_3$). Floated soda-lime glass can also be thermally tempered and thus meets the requirements for a safety glass. A known method for achieving this thermal tempering involves heating float glass panes which have been cut to size to approx. 600 to 700° C. and then cooling them very rapidly by means of a cold air stream. This heating and rapid cooling operation gives rise to significant compressive stresses in the surface of the glass and tensile stresses in the interior. This results in a considerable rise in the flexural strength of the glass, development of insensitivity to rapid temperature variations and a high resilience. In the event of ultra-high stress, such tempered glass breaks into a multitude of crystals with edges which are not very sharp.

In chemical tempering, compressive stress is attained in the surface of the glass by ion exchange. In the course of this, ions of greater radius which penetrate into the glass from outside replace smaller ions. As a result of the greater space requirement of the penetrating ions, a high compressive stress in the surface is attained, with which a 5- to 8-fold increase in strength can be achieved. Usually, the ion exchange is carried out with alkali metal atoms, either in salt melts or with the aid of applied pastes. A customary treatment is that with potassium atoms, which are exchanged for sodium atoms in the glass. It is important that the treatment is effected below the transformation temperature of the glass because the compressive stress is otherwise dissipated thermally.

As further constituents, a soda-lime glass may likewise comprise $Na_2O$, $K_2O$, $MgO$, $ZrO_2$, $CaO$, $SrO$, $BaO$, $ZnO$, $P_2O_5$, $TiO_2$ and $SnO_2$.

A typical soda-lime glass, as defined as standard glass by the DGG [German Glass Society], consists of the following constituents:

| | Constituent | | | | |
|---|---|---|---|---|---|
| | $SiO_2$ | $Al_2O_3$ | $Fe_2O_3$ | $TiO_2$ | $SO_3$ |
| Proportion in % by wt. | 71.72 | 1.23 | 0.191 | 0.137 | 0.436 |
| | Constituent | | | | |
| | CaO | MgO | $Na_2O$ | $K_2O$ | |
| Proportion in % by wt. | 6.73 | 4.18 | 14.95 | 0.338 | |

The viscosity is typically:

| | Temperature in ° C. | | | | |
|---|---|---|---|---|---|
| | 500 | 600 | 700 | 800 | 900 |
| Viscosity in d Pa s | $1.02 \times 10^{15}$ | $5.66 \times 10^{10}$ | $9.88 \times 10^{7}$ | $1.76 \times 10^{6}$ | $1.12 \times 10^{5}$ |
| | Temperature in ° C. | | | | |
| | 1000 | 1100 | 1200 | 1300 | 1400 |
| Viscosity in d Pa s | $1.49 \times 10^{4}$ | $3.19 \times 10^{3}$ | $9.32 \times 10^{2}$ | $3.41 \times 10^{2}$ | $1.48 \times 10^{2}$ |

Borosilicate glass refers to a silicate glass which contains generally between 7% and 15% boron oxide. Due to its composition, it has a comparatively high thermal cycling stability, and a very high hydrolytic and acid resistance. Just like soda-lime glass, it is floatable and is, for example, refined with sodium chloride in the course of production. Borosilicate float glasses are employed where relatively high chemical resistance and high thermal durability are important. Borosilicate glasses may likewise be present in thermally tempered form. Borosilicate glasses preferably have a transformation temperature between 535° C. and 850° C., a softening point below 830° C. and a processing temperature below 1300° C.

As further constituents a borosilicate glass may likewise comprise $Na_2O$, $K_2O$, $MgO$, $ZrO_2$, $CaO$, $SrO$, $BaO$, $ZnO$, $P_2O_5$, $TiO_2$ and $SnO_2$.

A typical borosilicate glass consists of 70-78% by weight of $SiO_2$, 7-15% by weight of $B_2O_3$, 0-8% by weight of $Na_2O$, 0-8% by weight of $K_2O$, 0-8% by weight of $HO_2O_3$ and optionally up to 8% by weight of further constituents.

The inventive fire-resistant glazing preferably has high light transmittance.

The light transmittance for inventive glazing comprising glass ceramic is preferably at least 85%, especially at least 88%, for inventive borosilicate glazing at least 90% and for inventive soda-lime glass, likewise at least 90%.

The glass panes used in accordance with the invention are typically characterized by a coefficient of thermal expansion $\alpha_{20/300}$ between 2.8, especially between 3, and $10.0 \times 10^{-6}$/K.

Typical values are, for example, $3.3 \times 10^{-6}$/K for Boro 33 (Pyran White), approximately $9.0 \times 10^{-6}$/K for a soda-lime glass and $4.0 \times 10^{-6}$/K for Boro 40 (PyranS).

Suitable glasses and glass ceramics are also described in German patent specification DE 100 17 701 C2.

In an alternative embodiment, the transparent fire-resistant glazing may comprise glass ceramic panes.

Glass ceramic consisting of one crystalline and one residual glass phase. The starting glass phase is at first obtained by way of standard glass manufacturing processes. After fusion and refining, the glass typically undergoes hot shaping by rolling, casting or pressing. Thereafter, the glass is subjected to a heat treatment, as a result of which the glass is partly converted in a controlled manner to a finely divided, crystalline phase. The glass ceramic panes used in accordance with the invention have, within a temperature range from room temperature to about 700° C., an exceptionally low coefficient of thermal expansion $\alpha_{20/700} < 1.5 \times 10^{-6}$/K. Therefore, glass ceramic panes in transparent form are particularly suitable for use in fire-resistant glazing.

The glass ceramic pane used in accordance with the invention has preferably been produced in a float operation, and then ceramized in a gas film levitation process or by means of contact ceramization.

Layer (a) comprises at least one bromine-containing flame retardant. Advantageously, layer (a) comprises exclusively bromine-containing flame retardants.

Suitable flame retardants are, for example, polybrominated diphenyl ethers (PBDEs) such as decabromodiphenyl ether, brominated alcohols such as dibromoneopentyl alcohol, tribromoneopentyl alcohol, tetrabromobisphenol A (TBBA) and dibromobutenediol, polybrominated cycloalkanes, such as hexabromocyclododecane (HBCD), and the derivatives and/or mixtures of each.

Likewise suitable are mixed esters of tetrabromophthalic anhydride with diethylene glycol and propylene glycol, for example, SAYTEX® RB-79 from Albemarle Corporation, mixed esters of tetrabromophthalic anhydride with aromatic diols, for example SAYTEX® RB-8000 from Albemarle Corporation, or SAYTEX® RB-9130 and SAYTEX® RB-9170.

Preferably, layer (a) does not contain any phosphorus-containing flame retardants. Under the action of heat, phosphorus compounds lead to degradation products which attack glass panes or glass ceramic panes, the result being that they shatter when hit by water jets.

Layer (a) preferably likewise does not contain any fluorine-containing flame retardants, since the degradation products thereof can also attack glass or glass ceramic.

The bromine-containing flame retardant is compatible with the other components of the UV-curable material, in that a transparent product is obtained after curing in each case.

The bromine-containing flame retardants preferably do not polymerize with the other components of the UV-curable material.

The UV-curable material preferably comprises at least one oligomer selected from the group comprising monoacryfate oligomer and multiacrylate oligomer and at least one monomer with an acrylate functionality.

In principle, however, other resins of sufficient thermal stability are usable.

In general, the oligomer is prepared first, optionally in the presence of a reactive diluent. Then the oligomer formulation is formulated further by mixing it with other constituents, such as reactive diluents, i.e. monomers, one or more photo-initiators and additives. When different oligomers are desired, in multiple cases, individual oligomers can be synthesized and then mixed, or they can be synthesized together in a single one-pot synthesis.

The amount of oligomers in the UV-curable material is preferably 10% by weight to about 90% by weight, more preferably 15% by weight to 80% by weight and most preferably 20% by weight to 70% by weight.

The molecular weight of the oligomers is not particularly restricted. The number-average molecular weight of the oligomers may generally be less than about 25 000 g/mol and preferably less than about 10 000 g/mol and more preferably less than about 5000 g/mol. The molecular weight is generally preferably greater than about 500 g/mol.

A monoacrylate oligomer is an oligomer which has only one functional acrylate group. The monoacrylate may form the main chain for the polymer which forms on mixing with an acrylate copolymer and a multiacrylate oligomer. A multiacrylate oligomer is an oligomer which has at least two functional acrylate groups. The acrylate functionalities may be end groups, or they may be grafted on at a site within the oligomer chain. On mixing with the other components of the composition, the multiacrylate oligomer provides the crosslinks or branches which are needed for formation of a network with the monoacrylate monomer main chain.

The monoacrylate monomers and multiacrylate monomers are selected and provided in amounts such that the UV-curable material has the desired cohesive and adhesive strength. The oligomers are also present in such amounts that the transparency and thermal or moisture stability are also ensured.

The monoacrylate oligomers or multiacrylate oligomers may, for example, be urethane acrylate oligomers. These oligomers can be obtained by reaction of polyester polyols and polyisocyanates.

A polyester polyol can be formed by reacting a polybasic acid, for example terephthalic acid or maleic acid, with a polyhydric alcohol, for example ethylene glycol or 1,6-hexanediol. A polyether polyol which is used for preparation of the urethane acrylate oligomers may be selected, for example, from polyethylene glycol, polypropylene glycol, poly-(tetrahydrofuran), poly(2-methyltetrahydrofuran), poly(3-methyltetra-hydrofuran) and the like.

Urethane acrylate oligomers can then be synthesized, for example by reacting a polyisocyanate or another polyfunctional isocyanate compound with a polyhydric polyol, to give an isocyanate-terminated prepolymer. Subsequently, acrylates or methacrylates having a hydroxyl group can be reacted with the terminal isocyanate groups of the prepolymer. Both aromatic and aliphatic isocyanates can be used for reaction with the urethane to obtain the oligomer. Examples of diisocyanates which can be used for preparation of the acrylated oligomers are toluene 2,4-diisocyanate, toluene 2,6-diisocyanate, xylene 1,3-diisocyanate, xylene 1,4-diisocyanate, hexane 1,6-diisocyanate, isophorone diisocyanate and the like. Examples of hydroxyl-terminated acrylates which can be used for the preparation of the acrylated oligomers comprise, but are not restricted to, 2-hydroxyethyl (meth)acrylate, 2-hydroxypropyl (meth)acrylate, 4-hydroxybutyl (meth)acrylate, polyethylene glycol (meth)acrylate and the like. A urethane-acrylic oligomer comprises an acrylate group and at least one urethane group.

Alternatively, the monoacrylate oligomers or multiacrylate oligomers may be polyester acrylate oligomers, acrylated acrylic oligomers or polyether acrylate oligomers.

The UV-curable material comprises, as a further component, a monomer with an acrylate functionality. The acrylate functionality allows polymerization of the monomers using UV radiation.

The UV-curable material preferably contains 10% by weight to 90% by weight, more preferably 20% by weight to 80% by weight and most preferably 30% to 70% by weight of monomers. The monomers preferably have a molecular weight of not more than 550 or a viscosity at room temperature of not more than 300 mPa·s (measured in 100% monomer).

The monomer with acrylate functionality is capable of copolymerization with a monoacrylate oligomer or multiacrylate oligomer.

The monomer with an acrylate functionality is preferably selected from the group consisting of acrylic acid, methacrylic acid, β-carboxyethyl acrylate, butyl acrylate, butyl methacrylate, methyl acrylate, methyl methacrylate, 2-ethylhexyl acrylate, 2-ethylhexyl methacrylate, octyl acrylate, decyl acrylate, octyl methacrylate, decyl methacrylate, 2-hydroxyethyl acrylate, 2-hydroxyethyl methacrylate, phenoxyethyl acrylate, phenoxyethyl methacrylate, nonylphenol ethoxylate monoacrylate, nonylphenol ethoxylate monomethacrylate, β-carbonylethyl acrylate, 2-(2-ethoxyethoxy)ethyl acrylate, 1,6-hexanediol diacrylate (HDDA), pentaerythrityl triacrylate (PETIA), trimethylolpropane triacrylate (TMPTA) and trimethylolpropane triacrylate (TMPTA).

The UV-curable material likewise comprises a photoinitiator. A suitable photoinitiator is selected depending on the absorption characteristics of the glass with respect to UV radiation, such that a sufficient amount of UV radiation can penetrate through the glass pane or glass ceramic pane and initiates the polymerization by activation of the photoinitiator.

Apart from the aforementioned condition, selection of the photoinitiators is unlimited. It is possible to use conventional photoinitiators. Examples include benzophenone and/or acetophenone derivatives, such as α-hydroxyalkyl phenyl ketone, benzoin alkyl ethers and benzyl ketals, monoacylphosphine oxides and bisacylphosphine oxides. Preferred photoinitiators are 1-hydroxycyclohexyl phenyl ketone (Irgacure® 184, Ciba Geigy), 2-hydroxy-2-methyl-1-phenyl-propane-1-one (Darocure® 1173) and (2,4,6-trimethylbenzoyl) diphenylphosphine oxide (Lucirin® TPO).

The amount of the photoinitiator is not particularly restricted. With regard to rapid curing rate, appropriate costs, good surface and through-curing, an optimal amount of photoinitiator is selected, which likewise prevents yellowing in the course of aging. In the UV-curable composition this amount is within the range between 0.3% by weight and 10% by weight, preferably between 1% by weight and 5% by weight.

In addition, the UV-curable material comprises further conventional additives in effective amounts. For example, it is possible to use additives, such as stabilizers for prevention of gelation, UV screening compounds, leveling aids, polymerization inhibitors, adhesion accelerators, light stabilizers, chain transferers, colorants, including pigments and dyes, plasticizers, fillers, wetting improvers and separation additives, and also preservatives.

In an alternative embodiment, the UV-curable material may likewise comprise inorganic hydroxides such as aluminum trihydroxide, magnesium hydroxide, brucite, hydromagnesite, aluminum phosphinates, mixed metal hydroxides and/or mixed metal hydroxycarbonates, inorganic oxides such as magnesium oxide, and/or antimony trioxide, silicone, silicon dioxide and/or silicate derivatives, and/or other organic materials, such as magnesium calcium carbonate, barium metaborate, zinc borate, zinc hydroxystannate, zinc stannate, zinc metaborate, expandable graphite and/or mixtures of glassy materials which function as a flame-retardant barrier.

The UV-curable material is selected in each case such that the fire-resistant glazing is transparent.

At a thickness of 9 nm, the transparent fire-resistant glazing preferably exhibits a transmittance of at least 80%, more preferably of at least 85% and most preferably of at least 88%.

The layer (a) of a UV-curable material preferably has a viscosity at 25° C. in the vicinity of about 140 mPa·s.

The result of the low viscosity and the associated elastic properties is that the layer (a) enables the production of transparent fire-resistant glazing with good sound-deadening properties.

The present invention further provides a process for producing transparent fire-resistant glazing, comprising the steps of
(a) cleaning the glass panes or glass ceramic panes,
(b) masking the panes such that there is a gap between the panes,
(c) filling the gap with a UV-curable material, and
(d) curing the material with UV radiation.

The panes are cleaned by means of acetone or isopropanol.

The glass panes or glass ceramic panes are masked with the aid of double-sided adhesive tape, which also functions as a spacer. This gives rise to a gap between the glass panes or glass ceramic panes, which is filled with the UV-curable material. The UV-curable material is subsequently cured by UV radiation. The cure with UV radiation is affected for a period of 15 to 25 min, more preferably for a period of 19 to 21 min, with radiation of a wavelength in the range from 300 to 400 nm.

The process according to the invention allows the gap to be filled such that no gas bubbles form. In contrast to the use of a PVB film as an intermediate layer in fire-resistant glazing, the unevenness of the glass pane or glass ceramic pane is of no importance in the case of use of UV-curable material in an intermediate layer. Therefore, it is also possible to bond glass panes or glass ceramic panes with relatively high unevenness in transparent fire-resistant glazing in a simple manner.

The invention further provides for the use of transparent fire-resistant glazing as multiple glazing, in mobile units, for example doors and windows, or fixed as an element of walls or facades.

EXAMPLES

Example 1

Non-Inventive

Fire-resistant glazing consisting of a pane of Pyran Patinum glass ceramic with a thickness of 5 mm and dimensions 1000 mm×2000 mm combined with a pane of the same glass ceramic with a thickness of 5 mm and an intermediate layer of a transparent PVB film with a thickness of 0.76 mm (Trosifol BG R20, Kuraray Europe GmbH, Trosifol Division).

The bonding between the glass ceramic panes and the PVB film was affected at first by preliminary bonding with application of 5 to 7 bar (pressure) and 60-70° C. on the glass surface (temperature), and a subsequent autoclave process, likewise under a pressure of 12 bar and at a temperature of 140° C.

The laminate thus produced was framed in a steel frame from Forster Rohr- und Profiltechnik AG (product name: Presto) with a surrounding glass insert of 15 mm and then tested in a fire furnace in accordance with EN 1363.

After 5 min the film exhibits bubbles; after 8 min the film begins to run out between the panes. In addition, there is significant evolution of smoke on the air side. After 12 min the gases which have escaped on the air side ignite. After 90 min the test was ended. The space was still enclosed at this time.

Example 2

Non-Inventive

Fire-resistant glazing consisting of a glass ceramic pane with a thickness of 5 mm and dimensions of 1000 mm×2000 mm, combined with a pane likewise of glass ceramic with the same dimensions and an intermediate layer of 1 mm thick UV-cured casting resin (Uvekols, from Cytec, Wiesbaden, Germany) without flame retardant. The bond between the panes and the casting resin was established by means of a UV curing process (25 min under UV light of 300-400 nm, Pyran Platinum L).

The laminate thus produced was framed in a steel frame with a surrounding glass insert of 15 mm, and then tested in accordance with EN 1363 in a fire furnace.

After 4 min a reaction of the resin was observed. From the 6th minute the intermediate layer began to run out and discolor. Gases which escaped on the air side ignited after 10 min. After 90 min the test was ended. The space was still enclosed at this time.

Example 3

Inventive

Fire-resistant glazing consisting of a pane of a glass ceramic with a thickness of 5 mm and the dimensions of 1000 m×2000 mm combined with a pane likewise of glass ceramic and a 1 mm low-flammability UV-cured intermediate layer comprising flame retardants (UVE-KOL FR-C). The bond between the layers and the intermediate layer was established by means of a UV curing process (25 min under UV light of 300-400 nm).

The laminate thus produced was framed in a steel frame with a surrounding glass insert of 15 mm and then tested in a fire furnace to EN 1363.

After 3 min, bubble formation was observed in the intermediate layer. After 4 min the discoloration of the intermediate layer commenced. Flame formation on the air side was not observed. After 90 min the test was ended. The space was still enclosed at this time.

Example 4

Non-Inventive

Fire-resistant glazing consisting of a pane of glass ceramic with a thickness of 3 mm and dimensions of 876 mm×1.938 mm combined with a pane likewise of 3 mm glass ceramic with a fluorine-containing intermediate layer having a thickness of 0.5 mm (Pyran Platinum L and THV film copolymer formed from tetrafluoroethylene, hexafluoropropylene, vinylidene fluoride) was produced in a process comprising preliminary bonding and an autoclave process.

Subsequently, the fire-resistant glazing was tested to DIN EN 12600 (pendulum test) with a 50 kg impact body from a fall height of 1200 mm. The impact resulted in a hole in the fire-resistant glazing with a dimension well above 76 mm. The test as required by the highest category of this standard was thus failed.

(analogous to example 1: 80-130° C. (glass temperature), 142 g/cm² in preliminary bonding; 145° C., 142 g/cm² in the autoclave).

Example 5

Inventive

Fire-resistant glazing consisting of a pane of glass ceramic (Pyran Platinum L) with a thickness of 3 mm and the dimensions of 876 mm×1.938 mm combined with a pane likewise of the same glass ceramic with a thickness of 3 mm and an intermediate layer of a low-flammability UV-curable material comprising a flame retardant (layer thickness 1 mm) was tested to DIN EN 12600 with a 50 kg impact body from a fall height of 1200 mm.

The hole formed in the laminate after the impact was smaller than 76 mm. According to the highest category of this standard, the test was thus passed.

What is claimed is:

1. A transparent fire-resistant glazing, comprising
   at least two panes, each of said panes being independently selected from the group consisting of glass panes and glass ceramic panes; and
   at least one layer (a) arranged between two of said panes, said at least one layer (a) comprising a UV-cured material;
   wherein said UV-cured material comprises polymerized components and at least one bromine-containing flame retardant; and
   wherein said at least one bromine-containing flame retardant is selected from the group consisting of polybrominated diphenyl ethers, brominated alcohols, polybrominated cycloalkanes, tetra-bromophthalic anhydride and esters of tetrabromophthalic anhydride.

2. The transparent fire-resistant glazing according to claim 1, wherein said at least one bromine-containing flame retardant is selected from the group consisting of decabromodiphenyl ether, dibromoneopentyl alcohol, tribromoneopentyl alcohol, tetrabromo-bisphenol A, dibromobutenediol and hexabromocyclododecane.

3. The transparent fire-resistant glazing according to claim 1, wherein each of said glass panes is transparent and tempered and wherein each of said glass ceramic panes are made of a material selected from the group consisting of borosilicate glass and soda-lime glass.

4. The transparent fire-resistant glazing according to claim 1, wherein each of said glass panes or each of said glass ceramic panes has a thickness in a range between 2 and 10 mm.

5. The transparent fire-resistant glazing according to claim 4, wherein said thickness is between 3 and 6 mm.

6. The transparent fire-resistant glazing according to claim 1, wherein said components comprise at least one monomer with an acrylate functionality and at least one oligomer, and wherein said at least one oligomer is selected from the group consisting of monoacrylate oligomers and multiacrylate oligomers, and wherein said components are polymerized with each other by UV radiation to form said polymerized components in said at least one layer (a).

7. The transparent fire-resistant glazing according to claim 1, wherein said at least one bromine-containing flame retardant is not polymerized with said polymerized components.

8. The transparent fire-resistant glazing according to claim 1, wherein said at least one layer (a) has a thickness in a range between 0.5 and 5 mm.

9. The transparent fire-resistant glazing according to claim 8, wherein said thickness is in a range between 0.8 mm and 1.2 mm.

10. A movable unit comprising a transparent fire-resistant glazing according to claim 1.

11. The movable unit according to claim 10, which is a door or a window.

12. A fixed unit comprising a transparent fire-resistant glazing according to claim 1.

13. The fixed unit according to claim 12, which is a wall or a façade of a structure.

14. A transparent fire-resistant glazing made by a process comprising the steps of:
   a) cleaning a plurality of panes, each of which is independently selected from the group consisting of glass panes and glass ceramic panes;
   b) masking said panes so that a gap is present between two of said panes,
   c) filling said gap with a UV-curable material to form a layer (a) between said two of said panes, and then
   d) curing the UV-curable material with UV radiation to form said transparent fire-resistant glazing;
   wherein said UV-curable material comprises at least one bromine-containing flame retardant; and
   wherein said at least one bromine-containing flame retardant is selected from the group consisting of polybrominated diphenyl ethers, brominated alcohols, polybrominated cycloalkanes, tetrabromophthalic anhydride and esters of tetrabromophthalic anhydride.

15. The transparent fire-resistant glazing according to claim 14, wherein said at least one bromine-containing flame retardant is selected from the group consisting of decabromodiphenyl ether, dibromoneopentyl alcohol, tribromoneopentyl alcohol, tetrabromobisphenol A, dibromo-butenediol and hexabromocyclododecane.

16. The transparent fire-resistant glazing according to claim 14, wherein said UV-curable material comprises at least one monomer with an acrylate functionality and at least one oligomer, and wherein said at least one oligomer is selected from the group consisting of monoacrylate oligomers and multiacrylate oligomers.

17. The transparent fire-resistant glazing according to claim 14, wherein said curing takes place for a duration of 15 to 25 min with radiation of a wavelength in a range from 300 to 400 nm.

18. The transparent fire-resistant glazing according to claim 17, wherein said duration is from 19 to 21 min.

* * * * *

UNITED STATES PATENT AND TRADEMARK OFFICE
Certificate

Patent No. 8,597,777 B2                      Patented: December 3, 2013

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Jens Klossek, Weimar (DE); Ruediger Freitag, Moorgrund/Etterwinden (DE); Klaus-Dieter Schwabe, Apolda (DE); Stefan Meinhardt, Neustadt an der Orla (DE); and Hugues Van den Bergen, Drogenbos (BE).

Signed and Sealed this Twentieth Day of May 2014.

CALLIE SHOSHO
*Supervisory Patent Examiner*
Art Unit 1787
Technology Center 1700